US009699537B2

(12) United States Patent
Oswald et al.

(10) Patent No.: US 9,699,537 B2
(45) Date of Patent: Jul. 4, 2017

(54) VEHICLE HEADREST WITH SPEAKERS

(71) Applicant: Bose Corporation, Framingham, MA (US)

(72) Inventors: Charles Oswald, Arlington, MA (US); Bradford Kyle Subat, Northborough, MA (US); Ryan C. Struzik, Hopkinton, MA (US)

(73) Assignee: Bose Corporation, Framingham, MA (US)

( * ) Notice: Subject to any disclaimer, the term of this patent is extended or adjusted under 35 U.S.C. 154(b) by 202 days.

(21) Appl. No.: 14/154,924

(22) Filed: Jan. 14, 2014

(65) Prior Publication Data

US 2015/0201260 A1 Jul. 16, 2015

(51) Int. Cl.
*H04B 1/00* (2006.01)
*H04R 1/02* (2006.01)
*B60N 2/48* (2006.01)

(52) U.S. Cl.
CPC ........... *H04R 1/025* (2013.01); *B60N 2/4876* (2013.01); *H04R 2499/13* (2013.01)

(58) Field of Classification Search
CPC ... H04R 1/025; H04R 2499/13; B60N 2/4876
USPC .................. 381/301, 302, 86, 388, 389, 333
See application file for complete search history.

(56) References Cited

U.S. PATENT DOCUMENTS

| | | |
|---|---|---|
| 3,944,020 A | 3/1976 | Brown |
| 4,027,112 A | 5/1977 | Heppner et al. |
| 4,042,791 A | 8/1977 | Wiseman |
| 4,156,117 A | 5/1979 | Phillips |
| 4,329,544 A | 5/1982 | Yamada |
| 4,490,842 A | 12/1984 | Watanabe |
| 4,638,884 A | 1/1987 | Lee |
| 4,694,497 A | 9/1987 | Kasai et al. |
| 4,696,370 A | 9/1987 | Tokumo et al. |
| 4,758,047 A | 7/1988 | Hennington |
| 4,797,934 A | 1/1989 | Hufnagel |
| 4,977,600 A | 12/1990 | Ziegler |
| 5,097,821 A | 3/1992 | Eakin |
| 5,143,055 A | 9/1992 | Eakin |
| 5,193,118 A | 3/1993 | Latham-Brown et al. |

(Continued)

FOREIGN PATENT DOCUMENTS

| | | |
|---|---|---|
| DE | 2349425 A1 | 4/1975 |
| DE | 4419079 C1 | 11/1995 |

(Continued)

OTHER PUBLICATIONS

Machine Translation of Cailleau French Publication No. 2620293, Mar. 10, 1989.*

(Continued)

*Primary Examiner* — Paul S Kim
*Assistant Examiner* — Katherine Faley
(74) *Attorney, Agent, or Firm* — Bose Corporation

(57) ABSTRACT

A vehicle headrest includes a main body portion having a front surface arranged to support a back of a head of a user. The main body portion includes first and second speakers which are disposed within the main body portion, and a cushion layer that is configured to surround the speakers and provide cushioning for a user's head. The cushion layer includes acoustic channels for controlling a radiation pattern of acoustic energy radiated from the speakers.

20 Claims, 17 Drawing Sheets

(56) References Cited

U.S. PATENT DOCUMENTS

| | | |
|---|---|---|
| 5,287,412 A | 2/1994 | Etzel et al. |
| 5,305,386 A | 4/1994 | Yamato |
| 5,325,435 A | 6/1994 | Date et al. |
| 5,368,359 A | 11/1994 | Eakin |
| 5,370,446 A | 12/1994 | Bancod |
| 5,398,992 A | 3/1995 | Daniels |
| 5,459,790 A | 10/1995 | Scofield et al. |
| 5,661,812 A | 8/1997 | Scofield et al. |
| 5,687,230 A | 11/1997 | Olausson et al. |
| 5,687,246 A | 11/1997 | Lancon |
| 5,710,818 A | 1/1998 | Yamato et al. |
| 5,748,748 A | 5/1998 | Fischer et al. |
| 5,784,473 A | 7/1998 | Ferren |
| 5,841,879 A | 11/1998 | Scofield et al. |
| 5,883,961 A | 3/1999 | House et al. |
| 5,887,071 A | 3/1999 | House |
| 5,889,875 A | 3/1999 | Caron et al. |
| 5,949,894 A | 9/1999 | Nelson et al. |
| 5,997,091 A | 12/1999 | Rech et al. |
| 6,021,208 A | 2/2000 | Kin-Lung |
| 6,089,663 A | 7/2000 | Hill |
| 6,094,496 A | 7/2000 | Stowers, Sr. |
| 6,144,747 A | 11/2000 | Scofield et al. |
| 6,217,118 B1 | 4/2001 | Heilig |
| 6,402,238 B1 | 6/2002 | Bigi et al. |
| 6,478,108 B1 | 11/2002 | Linhard et al. |
| 6,498,856 B1 | 12/2002 | Itabashi et al. |
| 6,681,024 B2 | 1/2004 | Klein et al. |
| 6,718,039 B1 | 4/2004 | Klayman et al. |
| 6,744,898 B1 | 6/2004 | Hirano |
| 6,812,900 B2 | 11/2004 | Ghabra et al. |
| 6,853,732 B2 | 2/2005 | Scofield |
| 6,904,157 B2 | 6/2005 | Shima |
| 6,965,787 B2 | 11/2005 | Kindo et al. |
| 6,975,737 B2 | 12/2005 | Hirao |
| 6,991,289 B2 | 1/2006 | House |
| 7,043,031 B2 | 5/2006 | Klayman et al. |
| 7,088,840 B2 | 8/2006 | Maekawa |
| 7,092,531 B2 | 8/2006 | Enya et al. |
| 7,130,440 B2 | 10/2006 | Maekawa et al. |
| 7,159,938 B1 | 1/2007 | Shiraishi |
| 7,162,048 B2 | 1/2007 | Shima |
| 7,268,677 B2 | 9/2007 | Enya et al. |
| 7,284,637 B2 | 10/2007 | Abe et al. |
| 7,366,607 B2 | 4/2008 | Nakaishi et al. |
| 7,367,886 B2 | 5/2008 | Loose et al. |
| 7,386,139 B2 | 6/2008 | Hashimoto et al. |
| 7,440,578 B2 | 10/2008 | Arai et al. |
| 7,508,952 B2 | 3/2009 | Hofmann et al. |
| 7,555,130 B2 | 6/2009 | Klayman et al. |
| 7,561,706 B2 | 7/2009 | Holmi et al. |
| 7,676,047 B2 | 3/2010 | Aylward et al. |
| 7,684,577 B2 | 3/2010 | Arai et al. |
| 7,688,992 B2 | 3/2010 | Aylward et al. |
| 8,019,454 B2 | 9/2011 | Haulick et al. |
| 8,031,879 B2 | 10/2011 | Eid et al. |
| 8,045,736 B2 | 10/2011 | Shibata et al. |
| 8,073,156 B2 | 12/2011 | Hutt et al. |
| 8,077,873 B2 | 12/2011 | Shridhar et al. |
| 8,090,116 B2 | 1/2012 | Holmi et al. |
| 8,103,017 B2 | 1/2012 | Nakagaki |
| 8,121,319 B2 | 2/2012 | Azizi et al. |
| 8,121,336 B2 | 2/2012 | Hutt et al. |
| 8,126,159 B2 | 2/2012 | Goose et al. |
| 8,130,987 B2 | 3/2012 | Kaneda et al. |
| 8,160,267 B2 | 4/2012 | Sakamoto |
| 8,199,940 B2 | 6/2012 | Yokota |
| 8,212,659 B2 | 7/2012 | Iwamoto |
| 8,213,646 B2 | 7/2012 | Matsumoto et al. |
| 8,238,578 B2 | 8/2012 | Aylward |
| 8,315,401 B2 | 11/2012 | Hayakawa et al. |
| 8,325,936 B2 | 12/2012 | Eichfeld et al. |
| 8,325,938 B2 | 12/2012 | Yokota |
| 2002/0031234 A1 | 3/2002 | Wenger et al. |
| 2003/0141967 A1 | 7/2003 | Aichi et al. |
| 2003/0186044 A1* | 10/2003 | Sauniere ............... A47C 7/185 428/315.7 |
| 2005/0123162 A1* | 6/2005 | Huffman ............. H04R 1/2826 381/337 |
| 2006/0222182 A1 | 10/2006 | Nakaishi et al. |
| 2006/0269068 A1 | 11/2006 | Yokota |
| 2007/0133949 A1 | 6/2007 | Tatsuta et al. |
| 2007/0195964 A1 | 8/2007 | Yokota |
| 2008/0037794 A1 | 2/2008 | Sugawara et al. |
| 2008/0260174 A1 | 10/2008 | Yokota |
| 2008/0273712 A1* | 11/2008 | Eichfeld .................. H04S 7/302 381/86 |
| 2008/0273722 A1 | 11/2008 | Aylward et al. |
| 2009/0214055 A1 | 8/2009 | Sawashi |
| 2010/0148550 A1 | 6/2010 | Kidd |
| 2010/0320819 A1 | 12/2010 | Cohen et al. |
| 2011/0235832 A1 | 9/2011 | Riopel |
| 2011/0286614 A1 | 11/2011 | Hess |
| 2012/0008806 A1 | 1/2012 | Hess |
| 2014/0233781 A1* | 8/2014 | Kawakami ............... D04H 1/46 381/359 |

FOREIGN PATENT DOCUMENTS

| | | |
|---|---|---|
| DE | 19513769 A1 | 10/1996 |
| EP | 0368291 A1 | 5/1990 |
| EP | 0993230 A2 | 4/2000 |
| EP | 1077156 A1 | 2/2001 |
| EP | 1083094 A1 | 3/2001 |
| EP | 1137319 A2 | 9/2001 |
| EP | 1372356 A1 | 12/2003 |
| EP | 2172058 A1 | 4/2010 |
| EP | 2179595 A1 | 4/2010 |
| FR | 1259088 A | 4/1961 |
| FR | 2620293 A1 | 3/1989 |
| FR | 2646330 A1 | 11/1990 |
| FR | 2696388 A1 | 4/1994 |
| FR | 2768099 A1 | 3/1999 |
| FR | 2768100 A1 | 3/1999 |
| FR | 2779313 A1 | 12/1999 |
| GB | 2224178 A | 4/1990 |
| JP | 5647197 A | 4/1981 |
| JP | 59174090 A | 10/1984 |
| JP | 60183900 A | 9/1985 |
| JP | 61-188243 A | 8/1986 |
| JP | 6478600 A | 3/1989 |
| JP | 01136843 | 5/1989 |
| JP | 01136844 A | 5/1989 |
| JP | 01202100 A | 8/1989 |
| JP | 0385095 | 4/1991 |
| JP | 0385096 | 4/1991 |
| JP | 03132198 A | 6/1991 |
| JP | 04137897 B2 | 5/1992 |
| JP | 04325338 B2 | 11/1992 |
| JP | 0479520 | 12/1992 |
| JP | 05-344584 A | 12/1993 |
| JP | 06161466 A | 6/1994 |
| JP | 0775578 B2 | 8/1995 |
| JP | 07227332 A | 8/1995 |
| JP | 07-264689 A | 10/1995 |
| JP | 07281675 A | 10/1995 |
| JP | 07288885 A | 10/1995 |
| JP | 0847078 A | 2/1996 |
| JP | 08314474 A | 11/1996 |
| JP | 09252499 A | 9/1997 |
| JP | 10143166 A | 5/1998 |
| JP | 10-194049 A | 7/1998 |
| JP | 11342799 A | 12/1999 |
| JP | 11355896 A | 12/1999 |
| JP | 3042731 B2 | 5/2000 |
| JP | 2000270390 A | 9/2000 |
| JP | 2001095646 A | 4/2001 |
| JP | 3232521 B2 | 11/2001 |
| JP | 3238965 B2 | 12/2001 |
| JP | 3256560 B2 | 2/2002 |
| JP | 2002191469 A | 7/2002 |
| JP | 2004016522 A | 1/2004 |
| JP | 2004016711 A | 1/2004 |

(56) References Cited

FOREIGN PATENT DOCUMENTS

| | | |
|---|---|---|
| JP | 2004191871 A | 7/2004 |
| JP | 2004226189 A | 8/2004 |
| JP | 2005027019 A | 1/2005 |
| JP | 2005150954 A | 6/2005 |
| JP | 2005159914 A | 6/2005 |
| JP | 2005167378 A | 6/2005 |
| JP | 2005167379 A | 6/2005 |
| JP | 3709136 B2 | 10/2005 |
| JP | 2006080886 A | 3/2006 |
| JP | 3790042 B2 | 6/2006 |
| JP | 2006222686 A | 8/2006 |
| JP | 2006-270302 A | 10/2006 |
| JP | 3831984 B2 | 10/2006 |
| JP | 2006273164 A | 10/2006 |
| JP | 2006279864 A | 10/2006 |
| JP | 2007003994 A | 1/2007 |
| JP | 2007053622 A | 3/2007 |
| JP | 4029776 B2 | 1/2008 |
| JP | 2008252686 A | 10/2008 |
| JP | 2009017094 A | 1/2009 |
| JP | 2009018600 A | 1/2009 |
| JP | 4338028 B2 | 9/2009 |
| JP | 4487627 B2 | 6/2010 |
| JP | 4692803 B2 | 6/2011 |
| JP | 4735920 B2 | 7/2011 |
| JP | 4756327 B2 | 8/2011 |
| JP | 4778272 B2 | 9/2011 |
| JP | 5042664 B2 | 10/2012 |
| JP | 05137630 B2 | 2/2013 |
| JP | 05-191342 B2 | 5/2013 |
| WO | 93/01951 A1 | 2/1993 |
| WO | 94/15815 A1 | 7/1994 |
| WO | 2004/056607 A1 | 7/2004 |
| WO | 2009/012500 A2 | 1/2009 |
| WO | 2009-012501 A2 | 1/2009 |
| WO | 2009012497 A1 | 1/2009 |
| WO | 2009012499 A1 | 1/2009 |
| WO | 2009/113319 A1 | 9/2009 |
| WO | 2012/013743 A1 | 2/2012 |

OTHER PUBLICATIONS

Machine Translation of Shibata Japanese Publication No. 07-264689, Oct. 13, 1995.*
International Search Report and Written Opinion dated Mar. 31, 2015 for International application No. PCT/US2015/011188.

* cited by examiner

VEHICLE HEADREST WITH SPEAKERS

BACKGROUND

This disclosure relates to a vehicle headrest.

FIGS. 1A through 1C illustrate an example of a headrest 100 that incorporates speakers 102. Referring to FIG. 1A, the speakers 102 are attached to a U-shaped support rod 104 and are positioned to lay in a region that is directly behind the user's head (i.e., as opposed to the being located on the left and right sides of the U-shaped support rod 104) and to fire outwardly, in diverging directions on either side of the headrest 100.

A small plastic enclosure 106 is attached to each speaker 102 for forming an acoustic enclosure. Each of those subassemblies then gets screwed into a two-piece sheet metal cage 108 which is secured to the U-shaped support rod 104. FIG. 1A shows a partial assembly with a front portion of the sheet metal cage 108 removed to view the speaker 102 and enclosures 106. FIG. 1B shows the sheet metal cage 108 fully assembled with the front portion 110 in place. This construction can leave a gap between a front portion 110 of the sheet metal cage 108 and the exposed surfaces of speakers 102 which can allow for leakage of acoustic energy between the speakers 102 resulting in left speaker radiation from right speaker opening and vice versa.

A molded piece of foam cushioning is placed around that assembly, which is subsequently covered with a cover material 112 (e.g., fabric or leather), and there are a pair of plastic covers 114 which include grille regions 116, for covering the speakers, that are off on either side of the headrest 100, as shown in FIG. 1C. The plastic covers 114 are secured to the sheet metal cage 108. The plastic covers 114 protect the speakers 102 and assist in directing the radiation of acoustic energy toward the front the headrest 100. In the finished assembly, the plastic covers 114 reside on either side of the molded foam cushioning and contribute to the overall width of the headrest 100.

SUMMARY

This disclosure is based, in part, on the realization that a headrest can be provided with cushioning member that includes acoustic channels for controlling a radiation pattern of acoustic energy radiated from speakers integrated within the headrest. Integrating acoustic channels within the cushioning member can eliminate the need for externally mounted structures for directing acoustic energy, which can help to reduce the overall width of the headrest. This can also eliminate the presence of hard plastic structures on the sides of the headrest which may pose a visual obstruction to a person seated in a seat including the headrest as well as persons seated behind the headrest, and, which may pose a hazard (i.e., something for the user's head or another passengers head to crash into) in a collision.

In one aspect, a vehicle headrest includes a main body portion having a front surface arranged to support a back of a head of a user. The main body portion includes first and second speakers which are disposed within the main body portion, and a cushion layer that is configured to surround the speakers and provide cushioning for a user's head. The cushion layer includes acoustic channels for controlling a radiation pattern of acoustic energy radiated from the speakers.

Implementations may include one of the following features, or any combination thereof.

In some implementations, the cushion layer defines the acoustic channels.

In certain implementations, the cushion layer defines cavities which are lined with an acoustically opaque material to provide the acoustic channels.

In some examples, the vehicle headrest includes acoustic chambers for enclosing back portions of the first and second speakers. The cushion layer surrounds the first and second speakers and the acoustic chambers.

In certain examples, the main body portion includes a core that is configured to support the speakers. The core defines portions of the acoustic chambers for the first and second speakers.

In some cases, the main body portion includes a back cover connected to the core. The back cover and the core together define the acoustic chambers.

In some implementations, the headrest includes one or more support rods connected to core.

In certain implementations, the core includes one or more sockets for receiving the one or more support rods.

In some examples, the cushion layer is configured to engage the core so as to inhibit leakage of acoustic energy between the first and second speakers in a region between an outer surface of the core and an inner surface of the cushion layer.

In certain examples, the speakers are arranged so as to direct acoustic energy in diverging directions, relative to each other.

In some cases, the speakers are arranged with firing angle of 15 degrees to 60 degrees.

In certain cases, the first and second speakers are arranged with a vertical elevation angle within 5 degrees from horizontal.

In some implementations, the acoustic channels have a vertical spread angle from the top and bottom of the speaker of 15 degrees to 30 degrees.

In certain implementations, the headrest includes grilles or acoustically transparent fabric disposed within the acoustic channels.

In some examples, the grilles are acoustically transparent with 50% or less acoustic occlusion.

In certain examples, a filler material is disposed within the acoustic channels, and the grilles inhibit the filler materials from contacting the speakers.

In some cases, the filler material is acoustically transparent with 2 dB or less loss in a 100 Hz to 5 kHz frequency band.

In certain cases, the cushion layer is formed of an acoustically opaque material.

In some implementations, the main body portion includes a cover layer covering the cushion layer.

In certain implementations, the cover layer covers the acoustic channels, and the cover layer is acoustically transparent at least in the regions covering the acoustic channels.

In another aspect, a vehicle seat includes a headrest which includes a main body portion having a front surface arranged to support a back of a head of a user. The main body portion includes first and second speakers which are disposed within the main body portion, and a cushion layer that is configured to surround the speakers and provide cushioning for a user's head. The cushion layer includes acoustic channels for controlling a radiation pattern of acoustic energy radiated from the speakers.

Implementations may include one of the above features, or any combination thereof.

DETAILED DESCRIPTION

Figure 1A:
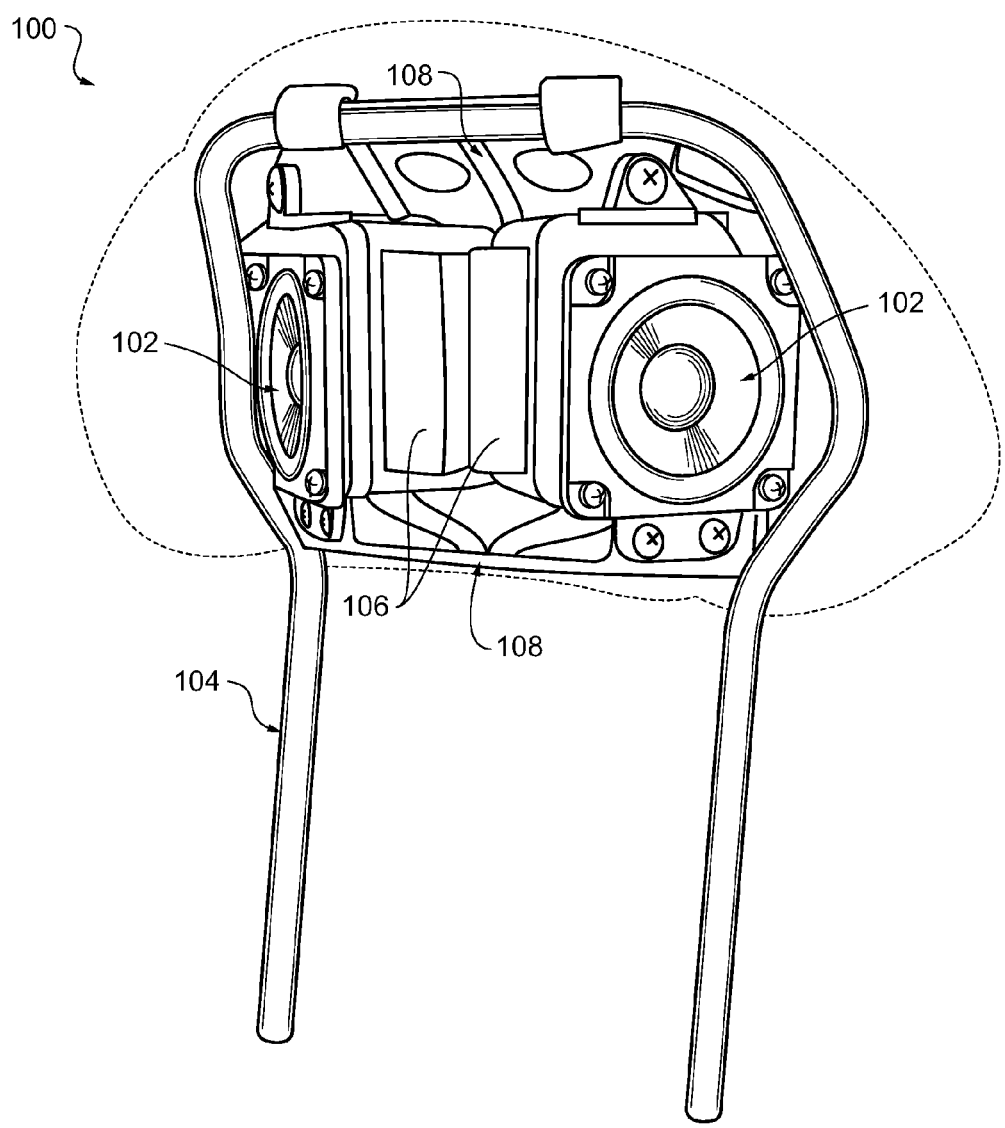
FIG. 1A is a perspective view of an inner portion of a prior art headrest having speakers, showing internal components of the headrest.
Figure 1B:
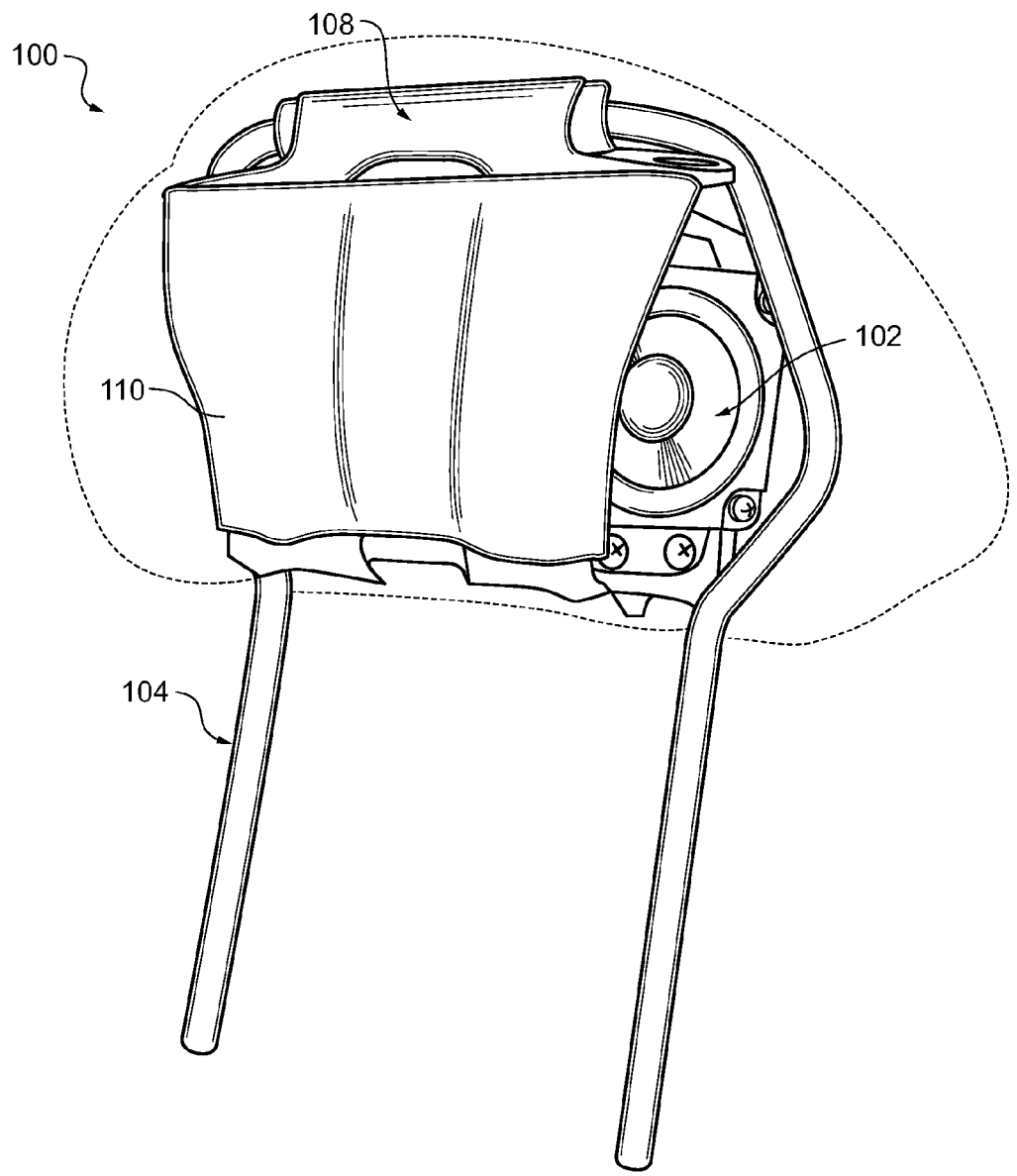
FIG. 1B is a perspective view of the prior art headrest of FIG. 1A, showing additional internal components of the headrest.
Figure 1C:
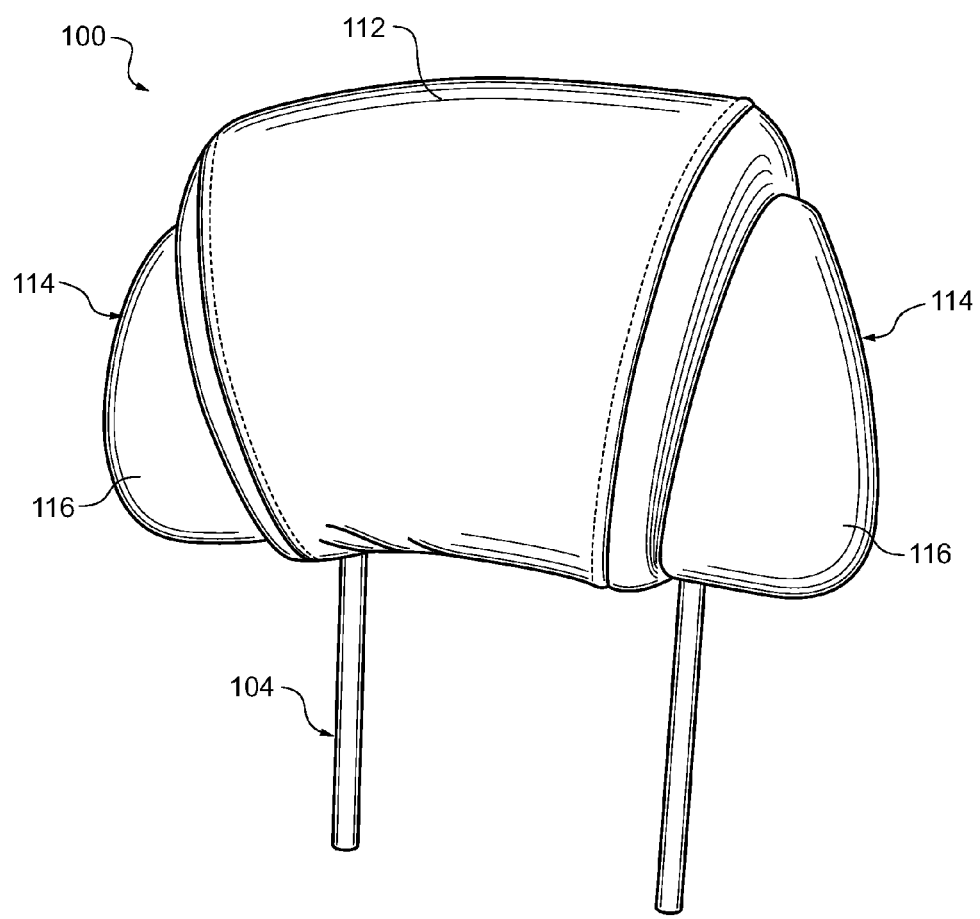
FIG. 1C is a perspective view of the prior art headrest of FIG. 1A, showing external components of the headrest.
Figure 2A:
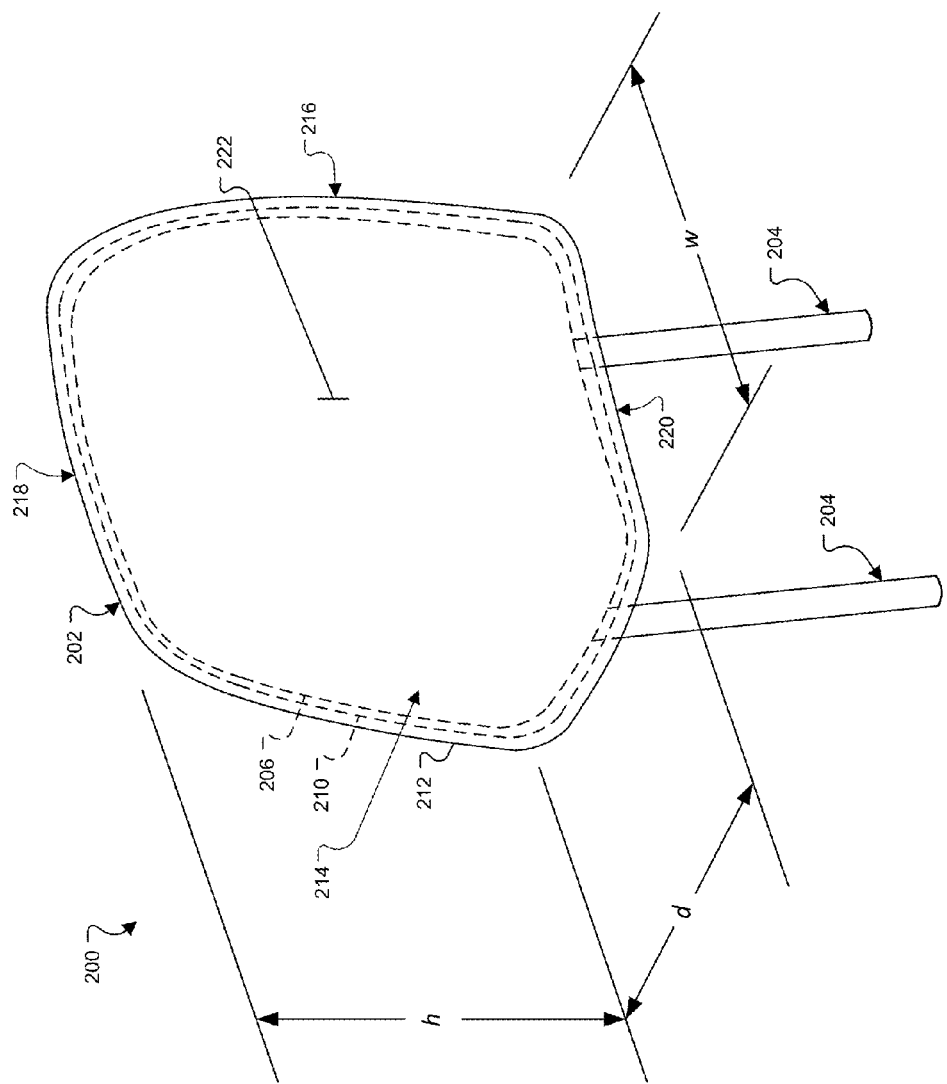
FIGS. 2A and 2B are front and back perspective views, respectively, of a vehicle headrest with acoustic channels for integrated speakers.
Figure 2B:
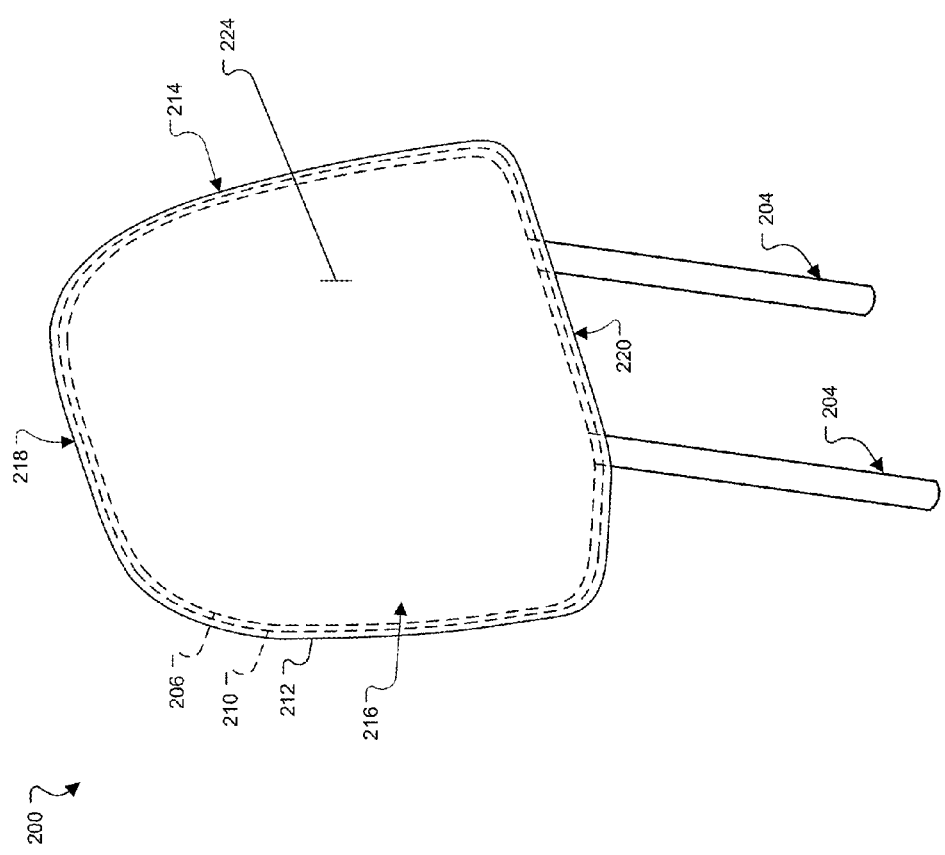

Referring to FIGS. 2A and 2B, an exemplary vehicle headrest 200 includes a main body portion 202 for supporting the back of a user's head; and one or more (two shown) support rods 204 for detachably mounting the headrest 200 to a seat back.

Figure 5A:
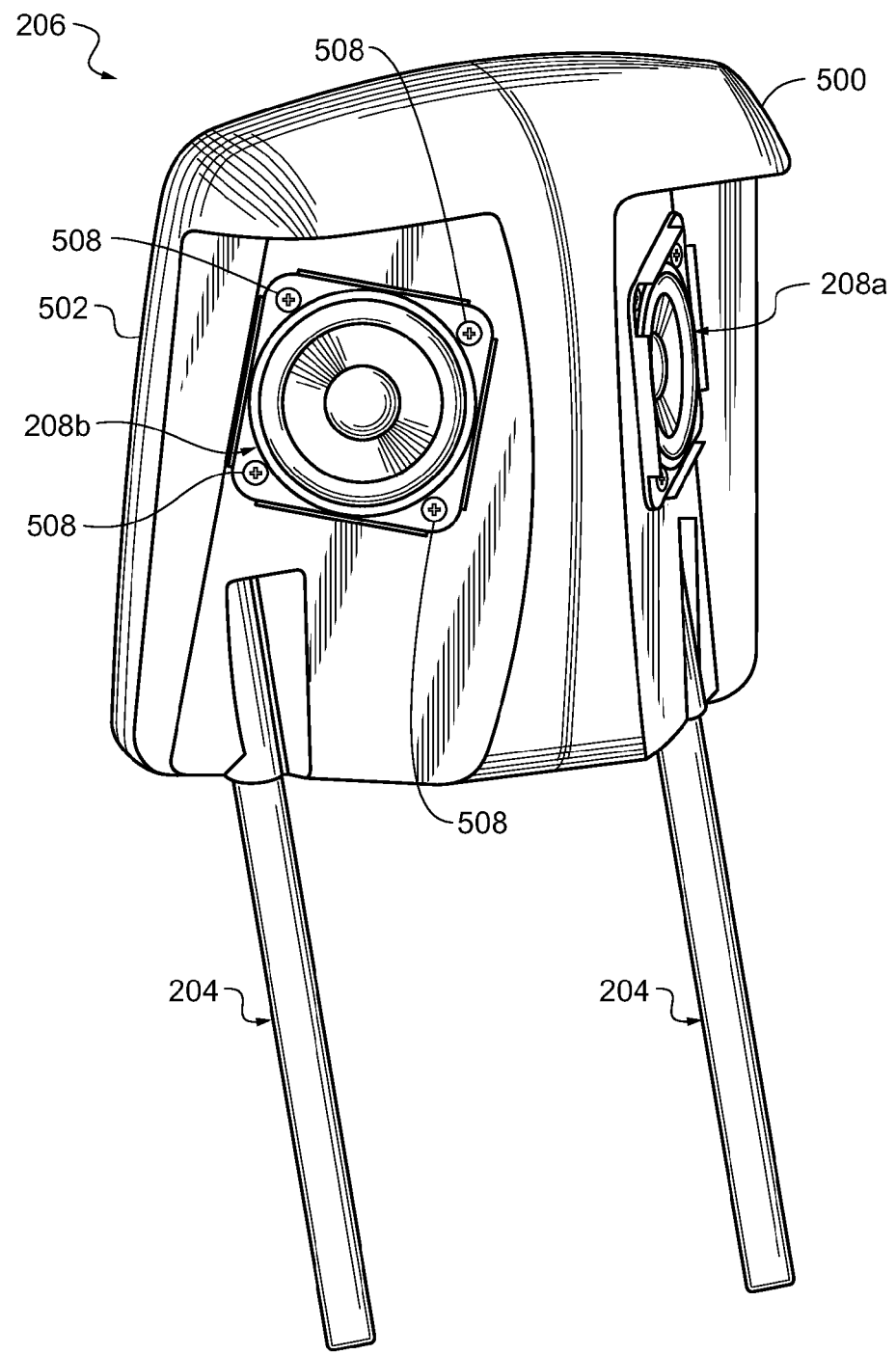
FIGS. 5A and 5B are front and back perspective views, respectively, of a core assembly from the vehicle headrest of FIGS. 2A and 2B.
Figure 5B:
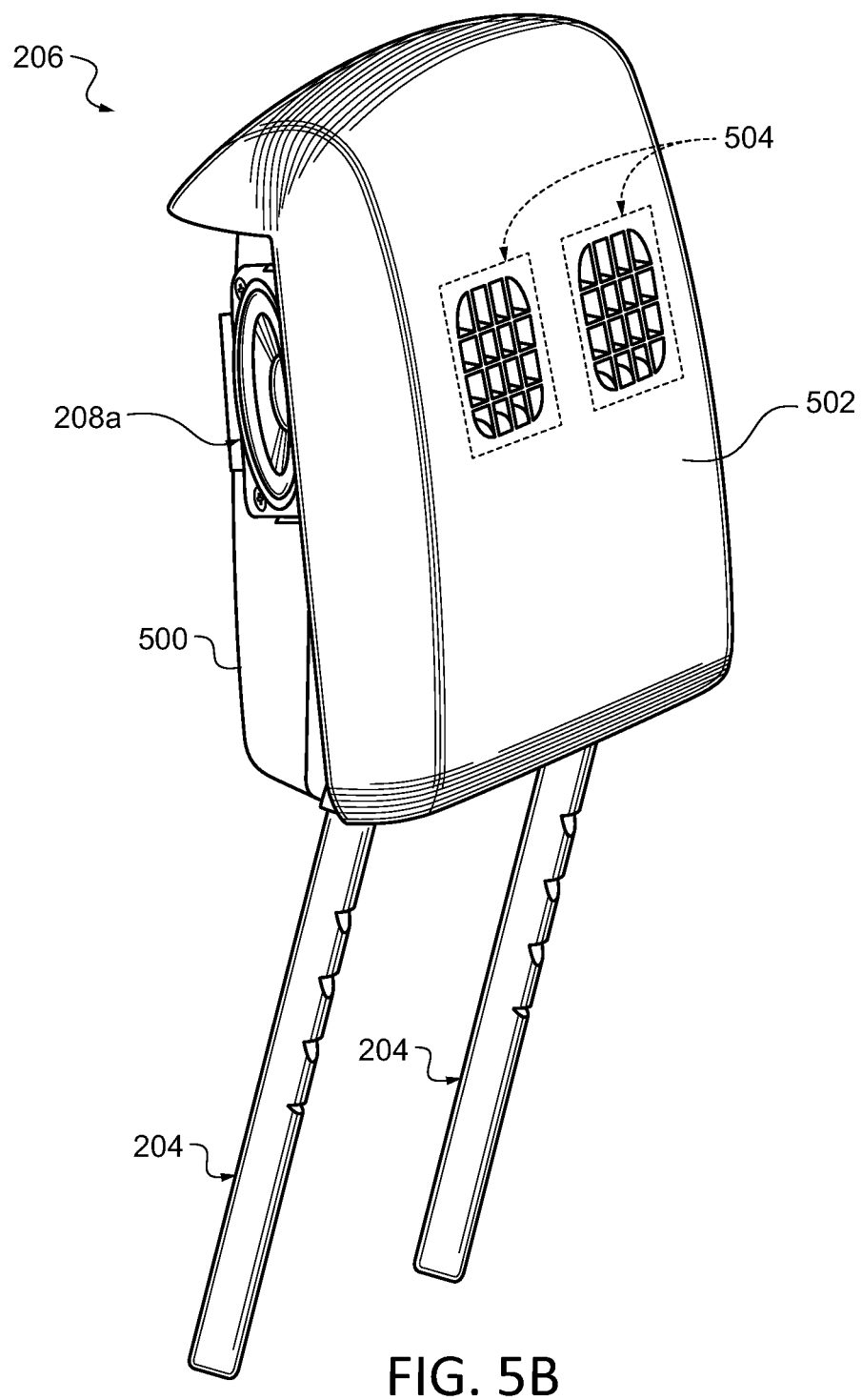

The main body portion 202 includes a core assembly 206 which houses a plurality of speakers (e.g., left and right speakers 208a, 208b, referenced collectively as "208" (see, e.g., FIGS. 5A and 5B). The core assembly 206 is enveloped with a cushion layer 210 which is then enveloped with a cover layer 212. In the completed assembly, the speakers 208 are entirely enclosed within the main body portion 202. The cover layer 212 can, for example, be a type of fabric capable of being drawn around the core assembly 206 and cushion layer 210.

In certain implementations, the main body portion 202 can have a width w of about 7.9 inches to about 11.4 inches (e.g., 8.5 inches to 9.6 inches); a height h of about 5.1 inches to about 9.1 inches (e.g., 7.5 inches to 9.1 inches); and a depth d of about 4.3 inches to about 7.5 inches (e.g., 4.9 inches to 7.5 inches).

The width w is the dimension measured at the widest point between the right side 214 of the main body portion 202 and the left side 216 of the main body portion 202. The right side 214 of the main body portion 202 is the side that is positioned toward the user's right hand side during normal, intended use. The left side 216 of the main body portion 202 is the side that is positioned toward the user's left hand side during normal, intended use.

The height h is the dimension measured at the widest point between the top 218 of the main body portion 202 and the bottom 220 of the main body portion 202. References to top and bottom are made with respect to the orientation of the headrest 200 during normal, intended use.

The depth d is the dimension measured at the widest point between the front and back surfaces 222, 224 of the main body portion 202. The front surface 222 of the main body portion 202 is the surface against which the back of a user's head rests during normal, intended use. The back (rear) surface 224 of the main body portion 202 is the surface opposite the front surface. The support rods 204 can be metal rods. One or more of the rods 204 can include a hollow center to serve as a conduit to provide wires into the core assembly 206 for driving the speakers 208.

The cushion layer 210 can include molded foam (e.g., polyurethane) that can be wrapped or assembled around the core assembly 206. It may be desirable to utilize a cushion material that provides high energy absorption for cushioning. For example, the cushion layer 210 can comprise a material having an energy absorption that meets automotive head restraint safety requirements; in one case safety requirements dictate that for a spherical mass of 6.8 kg traveling at 24.1 km/h, the 3 ms deceleration must not exceed 80 gs. It is also desirable to utilize a cushion material (e.g., a foam material) that provides for high acoustic damping to help acoustically isolate the speakers 208. The cover layer 212 (e.g., a fabric cover) can then be pulled over the cushion layer 210 to hold the cushion layer 210 tightly against the core assembly 206 such that the cover layer 212 assume the contours of the cushion layer 210.

Figure 3A:
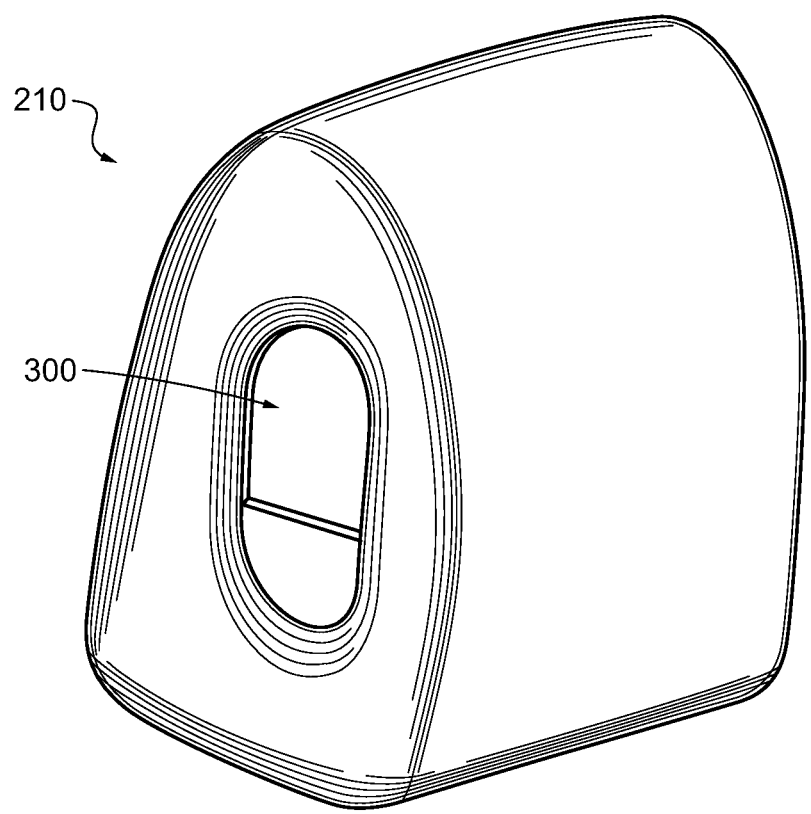
FIGS. 3A and 3B are front and back perspective views, respectively, of a cushion layer from the vehicle headrest of FIGS. 2A and 2B.
Figure 3B:
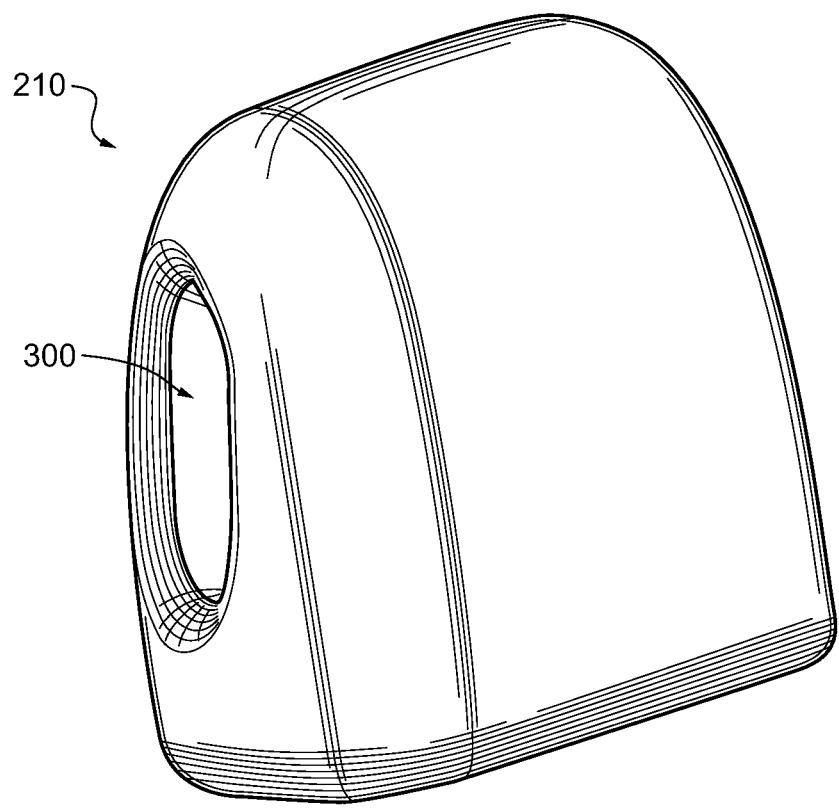

Referring to FIGS. 3A and 3B, the cushion layer 210 defines acoustic channels 300 for directing acoustic energy radiated from the speakers 208 (items 208a, 208b of FIGS. 5A and 5B).

The cushion layer 210 may consist of a unitary molded part that is formed to fit over the core assembly 206. The cushion layer 210 may include one or more seams which allow the cushion layer 210 to be fitted (e.g., wrapped) over the core assembly 206. The seams may include interlocking features (e.g., tongue-and-groove features) which mate when assembled. The cushion layer 210 may be held together at the seams via pressure applied by the cover layer 212 and or via adhesive.

Figure 4A:
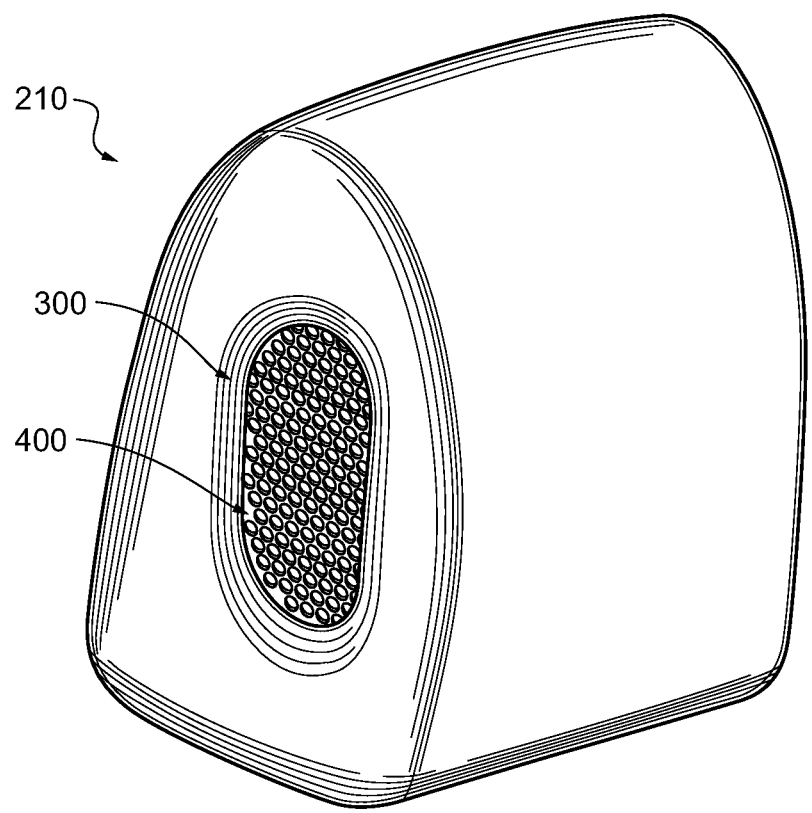
FIGS. 4A and 4B are front and back perspective views, respectively, of the cushion layer of FIGS. 3A and 3B shown with recessed grilles.
Figure 4B:
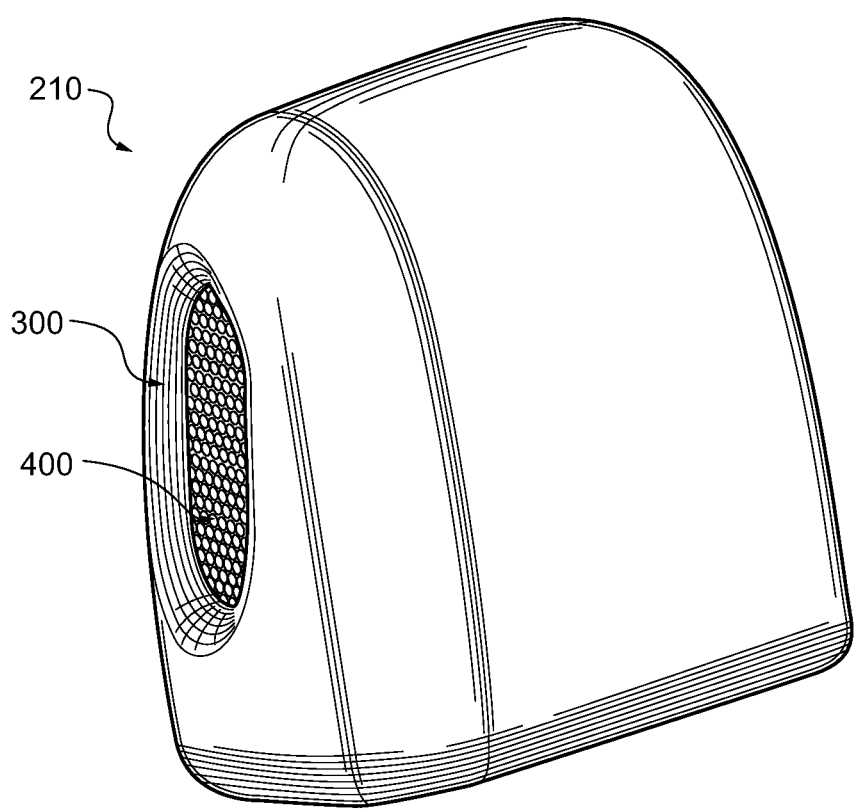

Referring to FIGS. 4A and 4B, grilles 400 may be provided to protect the speakers 208. The grilles 400 may be recessed within the acoustic channels 300. The acoustic channels 300 may, for example, include recesses 402 (FIG. 7B) for receiving edges of the grilles 400. Preferably, the grilles 400 have a maximum thickness of 3 mm, and are substantially acoustically transparent with 50% maximum occlusion. In some examples, the grilles 400 may serve as support for a fill material 716 (FIG. 7C) that can be placed in the acoustic channels 300. The acoustically transparent fill material (FIG. 7C) can help to obscure or hide the appearance of the acoustic channels 300 behind the cover layer 212, in which case, the cover layer 212 (FIG. 2) would be acoustically transparent at least in the regions overlying the acoustic channels 300.

Referring to FIGS. 5A and 5B, in the illustrated example, the core assembly 206 is a two piece design that includes a core 500 and a back cover 502. The core 500 receives and supports the speakers 208 and provides a rigid structural coupling between the support rods 204. The back cover 502 is secured to a back surface of the core 500 and assists in enclosing back portions of the speakers 208 to help provide sealed acoustic chambers 504.

Figure 6A:
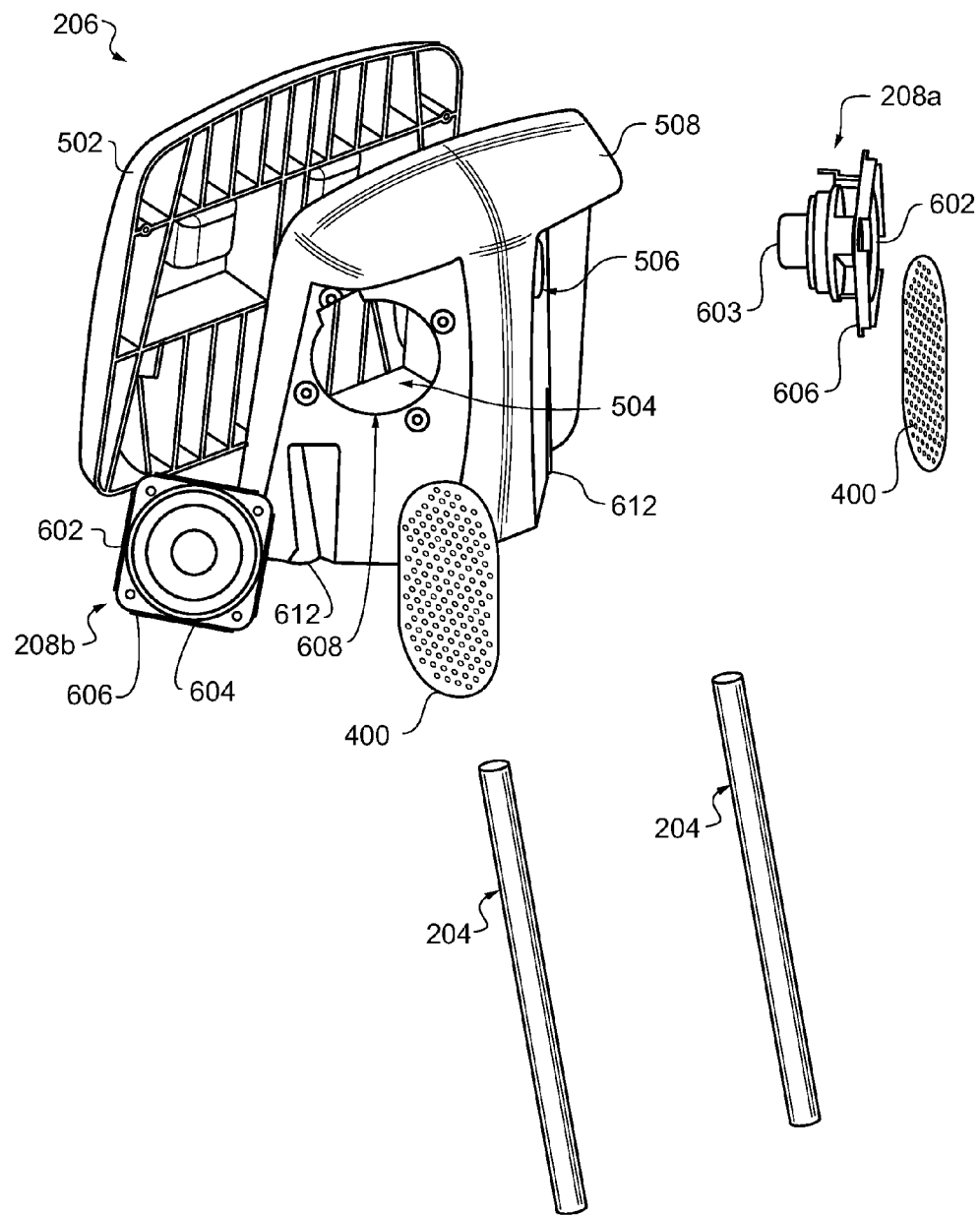
FIGS. 6A and 6B are front and back exploded perspective views, respectively, of the core assembly of FIGS. 5A and 5B.
Figure 6B:
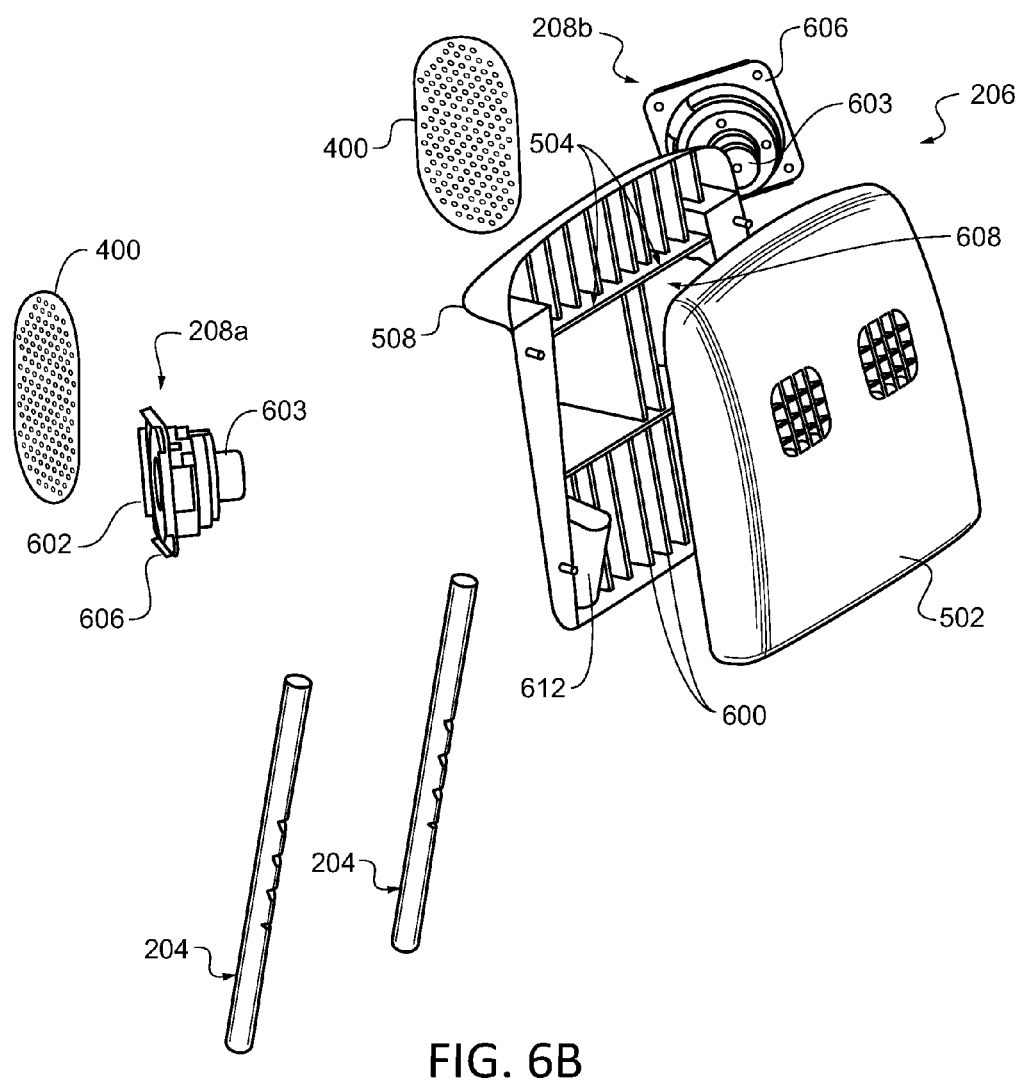

Referring to FIGS. 6A and 6B, the core 500 is the main structural element of the headrest 200 and is designed to be exposed to a significant amount of stress. The core 500 includes ribbing 600 (FIG. 6B) to help replicate the structural support that might otherwise be provided by a U-shaped portion of a traditional headrest support bar. The structural features (e.g., ribs 600) of the core 500, define side portions of acoustic chambers 504 for the speakers 208. The acoustic chambers 504 are sealed off with the back cover 502 which forms a back portion of the acoustic chambers 504. While the illustrated example includes two separate acoustic chambers 504 (one for each speaker), in some implementations, the core 500 may alternatively be configured such that plural speakers share a common acoustic chamber. The core 500 also defines openings 608 which allow back portions of the speakers 208 to be inserted into the acoustic chambers 504. The core 500 can be formed from plastic, such as acrylonitrile butadiene styrene (ABS), polycarbonate (PC), or a polyphenylene ether (PPE)+polystyrene (PS) blend, in an injection molding process.

Each of the speakers 208 includes a diaphragm 602, a drive unit 603 (e.g., a voice coil motor) arranged along a rear radiating surface of the diaphragm 602, a dust cap 604 arranged centrally along a front radiating surface of the diaphragm 602, and a speaker frame 606 for supporting the drive unit 603 and the diaphragm 602. The speaker frames 606 mount straight to the core 500 with screws 508 (FIG. 5A). The speakers 208 can be 0.75 inch to 3.1 inch diameter speakers. In some cases, the speakers may be arranged in pairs (e.g., pairs of 1 inch to 1.6 inch diameter speakers) on left and right sides. In some cases, the speakers may comprise oval speakers.

In some cases, wiring may be routed into the core 500 through one of the support rods 204. Alternatively, wiring might also be routed through a third, center post (not shown) rather than inside the support rods. In some cases, one or more slots may be formed in the core 500 in order to pass electrical wiring into the acoustic chambers 504 for driving the speakers 208. Such slots can be sealed during assembly.

The core 500 also defines sockets 612 for receiving a distal end portion of one of the support rods 204. The distal end portions of the support rods 204 are pushed up into the sockets 612. The connection between the sockets 612 and the support rods 204 can be a friction fit. Alternatively or additionally, the sockets 612 and the support rods 204 can include interlocking features that help to secure the rods 204 within the sockets 612. The sockets 612 are configured to provide sufficient structural overlap with the support rods 204 such that impact forces that hit the headrest are transmitted into the bars. Furthermore, while an implementation has been described in which the sockets 612 are defined by the core 500, in some cases, the sockets 612 may be formed separately from the core 500 and subsequently secured thereto (e.g., via adhesive or hardware).

The back cover 502 seals off the back of the core 500 from the left and the right so as seals off the back of the enclosure to provide two discrete, sealed acoustic chambers 504. The back cover 502 can be formed of molded plastic (e.g., polypropylene (PP), or acrylonitrile butadiene styrene (ABS)) and may be heat welded onto the core 500. In some cases, a fill material (e.g., a polyester fill) may be disposed within the acoustic chambers 504 to damp resonance within the chambers 504.

Figure 7A:
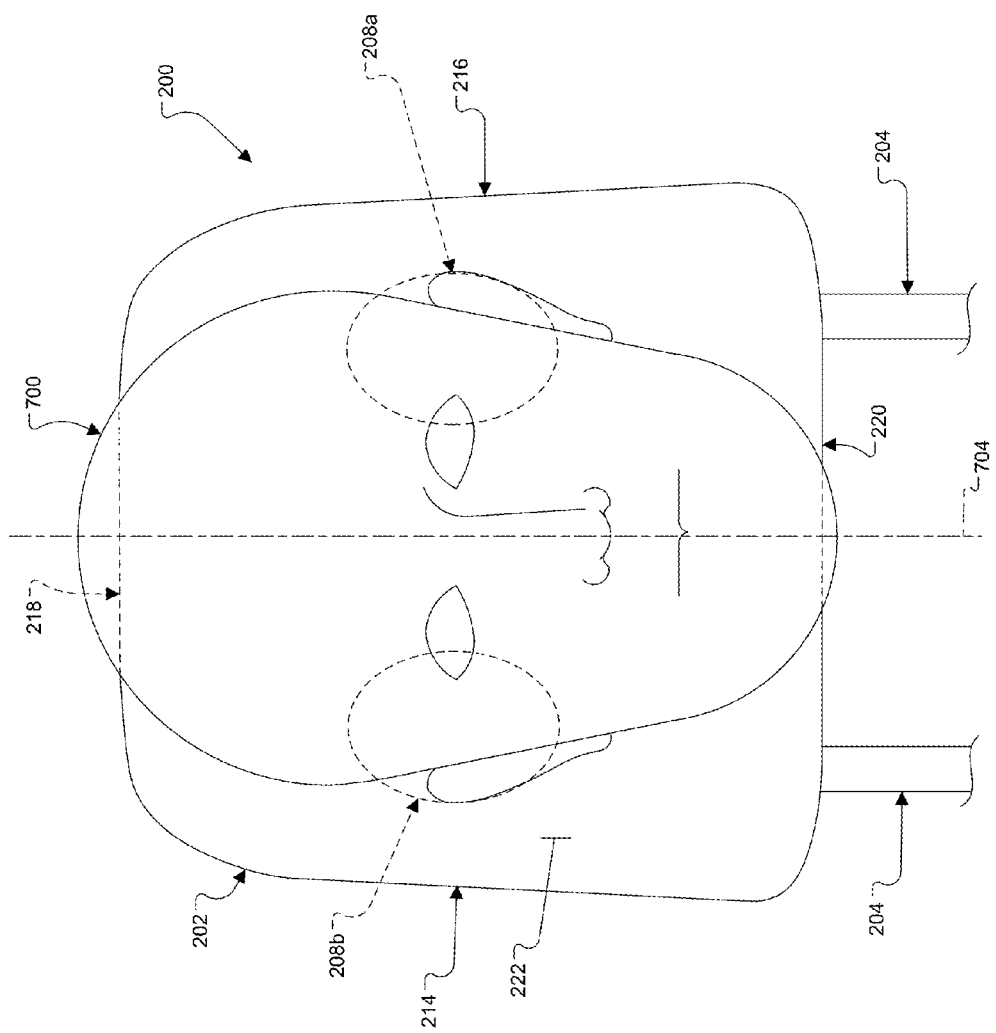
FIGS. 7A, 7B, and 7C are front elevation, top cross-sectional, and side views, respectively, of the vehicle headrest of FIGS. 2A and 2B shown with a user's head.
Figure 7B:
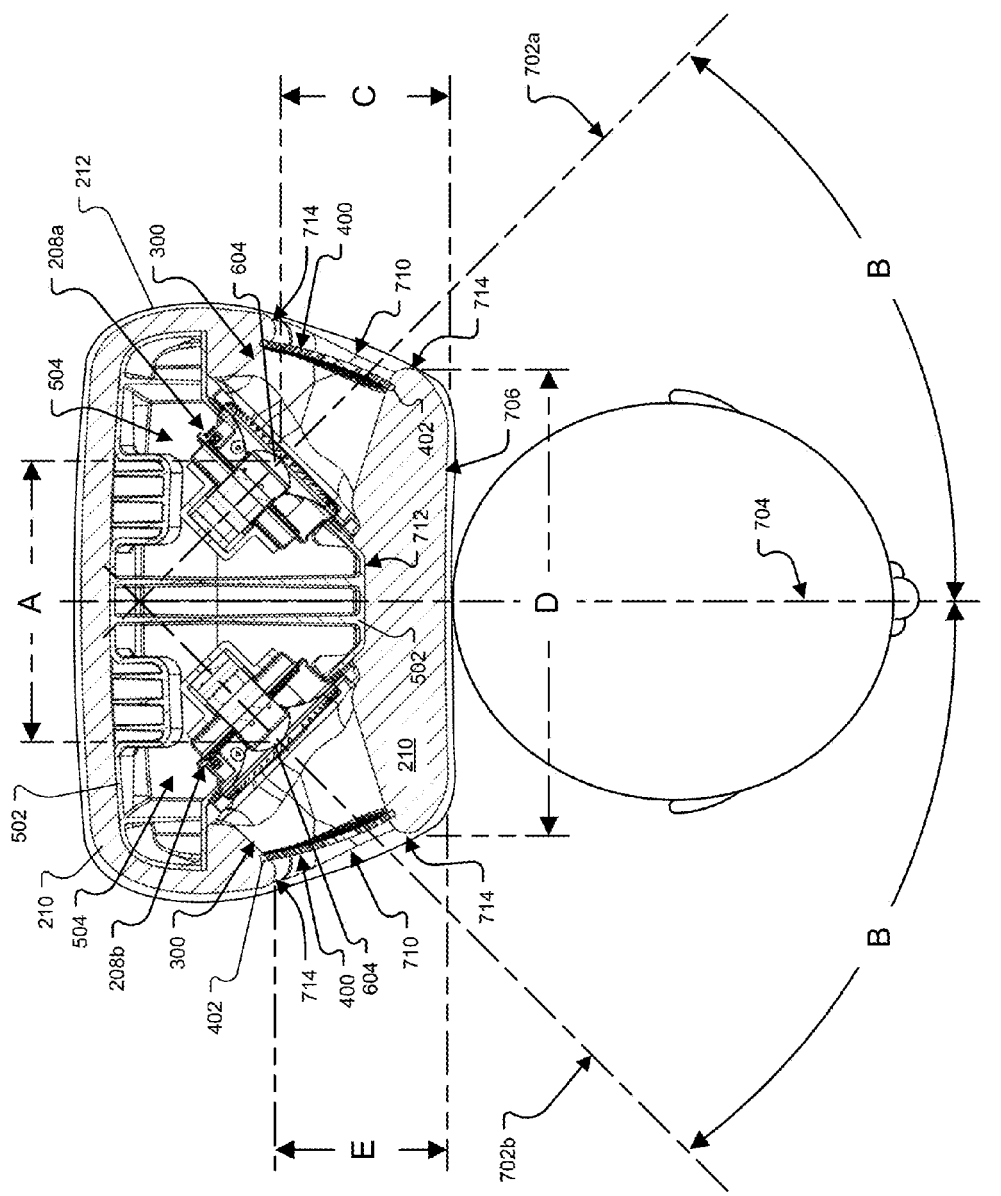
Figure 7C:
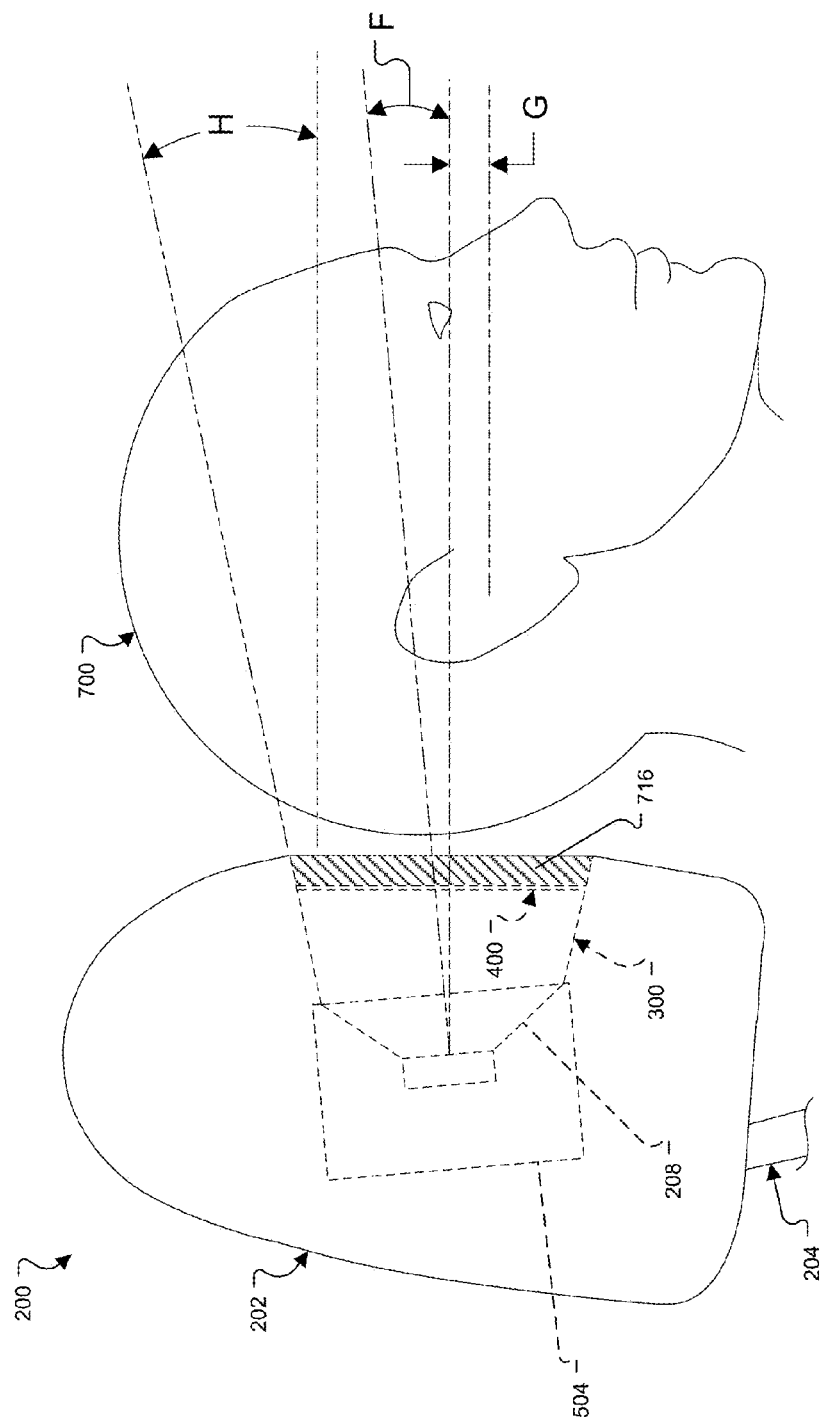

With reference to FIGS. 7A through 7C, the speakers 208 are arranged such that at least a portion of the speakers 208 is disposed directly behind a user's head 700 when the back of the user's head 700 rests against the front surface 222 of the main body portion 202 (such that the user is facing directly forward; i.e., no rotation of the user's head) and is centered left-to-right relative to main body portion 202. In some cases, the speakers 208 are arranged such that at least a portion of the speakers (i.e., at least 25% of the volume of the speakers 208, e.g., 40%-100% of the speaker volume) is disposed directly behind a user's head 700 when the back of the user's head rests against the front surface of the main body portion 202 and is centered relative to main body portion 202.

As used herein, "directly behind the user's head" is intended to mean not only behind a plane that is parallel to the back of the user's head, but also in a position that is within the breadth of the user's head and between the top of the user's head and the user's chin, such that, when viewed from the front surface of the main body portion 202 (as in FIG. 7A), at least a portion (e.g., a substantial portion) of the speakers 208 lays within the footprint of the user's head 700 oriented with the back of the head resting against, and centered with respect to, the front surface of the main body portion.

For the purposes of this disclosure, the user is assumed to have an average adult size head. In that regard, an average adult size head has a breadth (i.e., the maximum breadth of the head, usually above and behind the ears) of about 5.2 inches to about 6.5 inches; and a measured menton to top of head (i.e., the vertical distance from the tip of the chin (menton) to the level of the top of the head, measured with a headboard) of about 7.8 inches to about 10.0 inches.

Referring to FIG. 7B, the speakers 208 are arranged such that there is a 90 mm to 130 mm spacing (dimension A) from dust cap 604 to dust cap 604. Arranging the speakers 208 inside of the headrest 200 at such a tight spacing can help to eliminate obstructions to visibility, both for the user and for a passenger seated behind the user.

The speakers 208 are arranged to direct acoustic energy from their front radiating surfaces in diverging directions relative to one another. That is, the speakers 208 are each configured to radiate acoustic energy along a respective central axis 702a, 702b (which correspond to the displacement axes of the diaphragms) and may be positioned such that their central axes 702a, 702b cross a vertical plane 704 (i.e., a vertical plane that bisects the headrest 200 and extends through the front and back surfaces 222, 224 of the main body portion 202) at a point behind the front surface 222 of the main body portion 202.

In some cases, the speakers 208 are positioned such that their central axes 702a, 702b each diverge at an angle (dimension B) of about 30 degrees to about 60 degrees (e.g., about 40 to about 45 degrees) relative to the vertical plane 704. In some cases, the speakers 208 and speaker opening shapes are substantially symmetrical about the vertical plane 704.

Positioning the left and right speaker 208a, 208b so as to direct acoustic energy in diverging directions relative to one another helps in creating a discrete sound coming out of each speaker 208, and helps to ensure that the discrete sound coming out of the left speaker 208a does not cross-over to the right ear, and the discrete sound coming out the right speaker 208b does not cross-over to the left ear.

The speakers 208 are arranged such that the dust caps 604 are recessed from an outer surface of a front portion 706 of the cushion layer 210 a distance of 60 mm to 90 mm (dimension C). This provides sufficient spacing to allow for the formation of a shaped acoustic channel 300 which creates a radiation pattern to increase the efficiency from left speaker to left ear and right speaker to right ear compared to the left speaker to right ear and right speaker to left ear, respectively. Each of the acoustic channels 300 combined with the central axes 702a, 702b creates the desired radiation pattern. In some cases, such as in the illustrated example, the central axes of the acoustic channels 300 do not coincide with the displacement axes of the speaker diaphragms. For example, the central axis of the acoustic channels 300 may diverge from the displacement axes 702*a*, 702*b* of the speaker diaphragm. In some cases, the acoustic channels 300 are arranged such that their central axes each diverge at an angle, relative to the vertical plane 704, that is greater than an angle that the displacement axes of the speaker diaphragms diverge relative to the vertical plane 704.

The front portion 706 of the cushion layer 210 is 180 mm to 220 mm wide (dimension D) and is configured to provide cushioning for a user's head during normal use. The cushion layer 210 is acoustically absorptive and inhibits acoustic energy from passing through it, which has the effect of creating acoustic sources that are wider. That is, sound is inhibited from passing through the cushion layer 210, so substantially all (e.g., at least 90%) acoustic energy that is getting to the user has to pass through the acoustic channels 300 and hook around the front portion 706 of the cushion layer 210. This enables a wider sweet spot, which allows for a more consistent sound stage. This design can allow a user's head to lean such that the user's left or right ear is positioned at the middle of the headrest 200 and still hear substantially the same acoustic image.

The rear edges of the acoustic channels 300 along the sides the headrests 200 are positioned 40 mm to 70 mm (dimension E) away from the outer surface of the front portion 706. The inner surface 712 of the cushion layer 210 engages outer surfaces of the core assembly 206 to inhibit leakage between the speakers 208.

In some cases, all edges 714 around the second, outer open ends 710 of the acoustic channels 300 are rounded (e.g., having a radius of about 10 mm). The presence of sharp edges could create diffraction and create a sound image that looks like another source. The inclusion of rounded edges can reduce the likelihood of diffraction at the edges.

Referring to FIG. 7C, the speakers 208 are arranged with a vertical elevation angle (dimension F) of +/−5 degrees from horizontal. Preferably, the center height (dimension G) of the speakers 208 is within 0 mm to 20 mm of the user's ear height when the headrest is properly adjusted for safety.

The vertical spread angle (dimension H) from the top and bottom of the speaker circumference should be 15 degrees to 30 degrees for achieving a tapered shape. Acoustically transparent fill material 716, when used, within the acoustic channels 300 should be supported, e.g., by recessed grilles 400, to prevent interference at maximum cone excursion. The fill material 716 is acoustically transparent with 2 dB maximum loss in the 100 Hz to 5 kHz frequency range.

OTHER IMPLEMENTATIONS

While acoustic channels have been shown which are substantially oval in cross-section, acoustic channels with other cross-sectional shapes are possible. For example, the acoustic channels could alternatively be square or rectangular in cross-section. In another example, the acoustic channels could be circular in cross-section; for example, the acoustic channels could be frusto-conical in shape.

Figure 8:
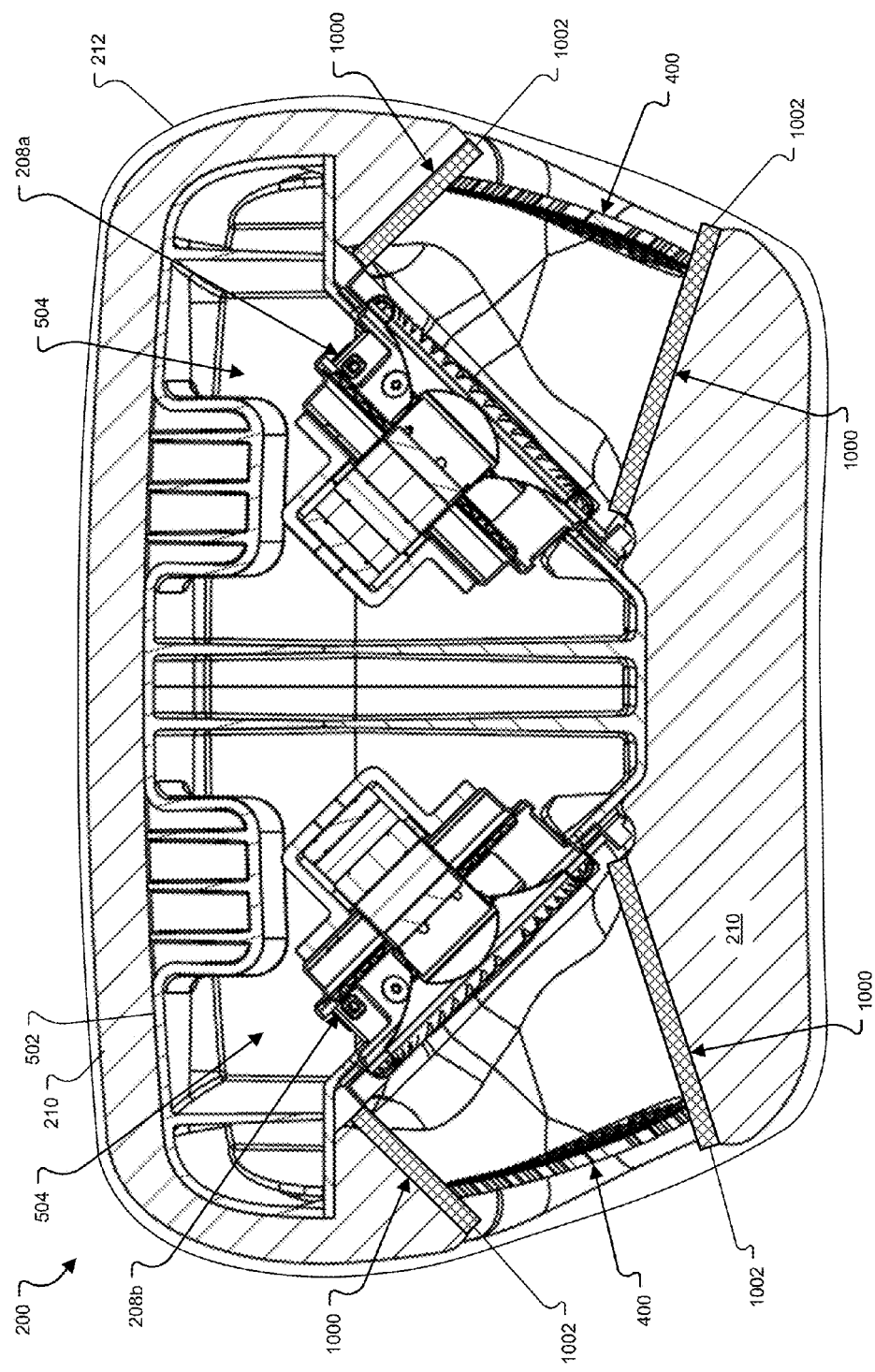
FIG. 8 is a top cross-sectional view of another implementation of a vehicle headrest with acoustic channels for integrated speakers.

While implementations have been described in which a cushion layer defines acoustic channels, other implementations are possible. For example, FIG. 8 illustrates an implementation in which the cushion layer 210 defines cavities 1000 which are lined with an acoustically opaque (i.e., not acoustically transparent) material 1002 to inhibit acoustic radiation from passing through the cushion layer 210 to provide the acoustic channels 300. This can allow the cushion layer 210 to be formed of an acoustically transparent material that includes cavities that are lined with an acoustically reflective material 1002 (e.g., an acoustically reflective plastic) to provide the acoustic channels 300. The lining material 1002 may be in the form of an insert (e.g., a molded plastic piece) that is inserted in the cavities 1000 in the cushion layer 210 or may be overmolded on the surfaces of the cushion layer 210 that form the cavities 1000 to provide the acoustic channels 300. The use of such a lining material 1002 may also provide added structural support to the headrest 200. In some cases, the lining material 1002 may be configured to support the grilles 400. In some examples, the grilles 400 may be integrally molded with the lining material 1002. Reference numbers in FIG. 8 refer to correspondingly numbered elements in previous figures.

While an implementation has been described in which the cushion layer is a unitary construction, the cushion layer may alternative comprise a plurality of foam pieces that are attached (e.g., with an adhesive) together and/or attached (e.g., via an adhesive) to the outer surface of the core assembly.

In some cases, the cover layer can include voids in the regions of the acoustic channels and the grilles can be left exposed through the voids in the cover layer.

Although implementations have been described in which support rods are provided for attaching a main body portion of a headrest to a seat back, in some cases, the main body portion may be integral with a seat back.

A number of implementations have been described. Nevertheless, it will be understood that additional modifications may be made without departing from the scope of the inventive concepts described herein, and, accordingly, other embodiments are within the scope of the following claims.

What is claimed is:
1. A vehicle headrest comprising:
a main body portion having a front surface arranged to support a back of a head of a user, the main body portion comprising:
i.) first and second speakers disposed within the main body portion, and
ii.) a cushion layer configured to surround the speakers and provide cushioning for a user's head, wherein a front portion of the cushion layer is 180 mm to 220 mm wide and the speakers are arranged such that dust caps of the speakers are recessed from an outer surface of the front portion of the cushion layer by a distance of 60 mm to 90 mm, and wherein the cushion layer has a molded form that includes one or more cavities that defines integrated acoustic channels for controlling a radiation pattern of acoustic energy radiated from the speakers, the acoustic channels having respective rear edges that are 40 mm to 70 mm from the outer surface of the front portion of the cushion layer, the cushion layer being formed of an acoustically opaque material that inhibits acoustic energy from passing through the cushion layer so that substantially all of the acoustic energy radiated from the first and second speakers passes through the acoustic channels and hooks around a front portion of the cushion layer towards the user's ears.
2. The vehicle headrest of claim 1, further comprising acoustic chambers for enclosing back portions of the first and second speakers, wherein the cushion layer surrounds the first and second speakers and the acoustic chambers.

3. The vehicle headrest of claim 2, wherein the main body portion comprises a core configured to support the speakers, and wherein the core defines portions of the acoustic chambers for the first and second speakers.

4. The vehicle headrest of claim 3, wherein the main body portion comprises a back cover connected to the core, and wherein the back cover and the core together define the acoustic chambers.

5. The vehicle headrest of claim 3, further comprising one or more support rods connected to core.

6. The vehicle headrest of claim 5, wherein the core includes one or more sockets for receiving the one or more support rods.

7. The vehicle headrest of claim 3, wherein the cushion layer is configured to engage the core so as to inhibit leakage of acoustic energy between the first and second speakers in a region between an outer surface of the core and an inner surface of the cushion layer.

8. The vehicle headrest of claim 1, wherein the speakers are arranged so as to direct acoustic energy in diverging directions, relative to each other.

9. The vehicle headrest of claim 8, wherein the speakers are arranged with a firing angle of 15 degrees to 60 degrees from vertical.

10. The vehicle headrest of claim 1, wherein the first and second speakers are arranged with a vertical elevation angle within 5 degrees from horizontal.

11. The vehicle headrest of claim 1, wherein the acoustic channels have a vertical spread angle from the top and bottom of each speaker of 15 degrees to 30 degrees.

12. The vehicle headrest of claim 1, further comprising grilles or acoustically transparent fabric disposed within the acoustic channels.

13. The vehicle headrest of claim 1, further comprising grilles that are acoustically transparent with 50% or less acoustic occlusion.

14. The vehicle headrest of claim 1, further comprising grilles and filler material disposed within the acoustic channels, wherein the grilles inhibit the filler material from contacting the speakers.

15. The vehicle headrest of claim 14, wherein the filler material is acoustically transparent with 2 dB or less loss in a 100 Hz to 5 kHz frequency band.

16. The vehicle headrest of claim 1, wherein the main body portion comprises a cover layer covering the cushion layer.

17. The vehicle headrest of claim 16, wherein the cover layer covers the acoustic channels, and wherein the cover layer is acoustically transparent at least in the regions covering the acoustic channels.

18. A seat comprising the headrest of claim 1.

19. The vehicle headrest of claim 1, wherein each of the one or more cavities is lined with an acoustically reflective lining material.

20. The vehicle headrest of claim 1, wherein the main body portion further comprises a molded plastic insert that is inserted into the one or more cavities to further define the one or more acoustic channels and provide additional structural support to the headrest.

* * * * *